US010261835B2

(12) United States Patent
Joao et al.

(10) Patent No.: US 10,261,835 B2
(45) Date of Patent: Apr. 16, 2019

(54) HARDWARE THREAD SCHEDULING

(71) Applicant: ARM Limited, Cambridge (GB)

(72) Inventors: Jose Alberto Joao, Austin, TX (US); Alejandro Rico Carro, Auston, TX (US); Ziqiang Huang, Shanghai (CN)

(73) Assignee: ARM Limited, Cambridge (GB)

( * ) Notice: Subject to any disclaimer, the term of this patent is extended or adjusted under 35 U.S.C. 154(b) by 87 days.

(21) Appl. No.: 15/464,574

(22) Filed: Mar. 21, 2017

(65) Prior Publication Data
US 2018/0276046 A1 Sep. 27, 2018

(51) Int. Cl.
*G06F 9/50* (2006.01)
*G06F 9/48* (2006.01)
*G06F 9/52* (2006.01)
*G06F 9/30* (2018.01)
*G06F 9/38* (2018.01)
*G06F 12/0875* (2016.01)
*G06F 12/084* (2016.01)

(52) U.S. Cl.
CPC .......... *G06F 9/5044* (2013.01); *G06F 9/3009* (2013.01); *G06F 9/30101* (2013.01); *G06F 9/3802* (2013.01); *G06F 9/3855* (2013.01); *G06F 9/4881* (2013.01); *G06F 9/52* (2013.01); *G06F 12/084* (2013.01); *G06F 12/0875* (2013.01); *G06F 2212/452* (2013.01); *G06F 2212/62* (2013.01)

(58) Field of Classification Search
CPC ..................................................... G06F 9/5044
See application file for complete search history.

(56) References Cited

U.S. PATENT DOCUMENTS

2007/0030278 A1* 2/2007 Prokopenko .......... G06F 9/5044
345/506
2013/0097607 A1* 4/2013 Lewis .................. G06F 9/4843
718/102

OTHER PUBLICATIONS

ARM® v7-M Architecture Reference Manual, ARM, 2014 (Year: 2014).*

* cited by examiner

*Primary Examiner* — Charlie Sun
(74) *Attorney, Agent, or Firm* — Nixon & Vanderhye P.C.

(57) ABSTRACT

An apparatus has processing circuitry to execute instructions from multiple threads and hardware registers to store context data for the multiple threads concurrently. At a given time a certain number of software-scheduled threads may be scheduled for execution by software executed by the processing circuitry. Hardware thread scheduling circuitry is provided to select one or more active threads to be executed from among the software-scheduled threads. The hardware thread scheduling circuitry adjusts the number of active threads in dependence on at least one performance metric indicating performance of the threads.

17 Claims, 6 Drawing Sheets

HARDWARE THREAD SCHEDULING

BACKGROUND

Technical Field

The present technique relates to the field of data processing.

Technical Background

Some data processing apparatuses may support concurrent execution of two or more threads of processing, with hardware registers being provided to store context data for multiple threads concurrently. This approach can be referred to as simultaneous multithreading (SMT), and can help increase the efficiency of utilisation of hardware resources and improve performance because if one thread is stalled another thread can continue to make progress, without incurring the thread switching latency of software-controlled context switches (where the registers only store context for one thread at a time and so an interrupt would trigger software to save the context data for the old thread to memory and replace it with context data for a new thread). With SMT, multiple threads can have instructions in flight within the pipeline simultaneously and the respective sets of context data for each thread may be accessible simultaneously within the hardware registers.

SUMMARY

At least some examples provide an apparatus comprising:
processing circuitry to execute instructions of a plurality of threads of processing;
hardware registers to store context data for the plurality of threads concurrently; and
hardware thread scheduling circuitry to select, from among a plurality of software-scheduled threads scheduled for execution by software executing on the processing circuitry, one or more active threads to be executed concurrently on the processing circuitry;
wherein the hardware thread scheduling circuitry is configured to adjust the number of active threads in dependence on at least one performance metric indicative of processing performance of the one or more active threads.

At least some examples provide an apparatus comprising:
means for executing instructions of a plurality of threads of processing using hardware registers to store context data for the plurality of threads concurrently; and
means for selecting, from among a plurality of software-scheduled threads scheduled for execution by software executing on the means for executing, one or more active threads to be executed concurrently on the means for executing;
wherein the means for selecting is configured to adjust the number of active threads in dependence on at least one performance metric indicative of processing performance of the one or more active threads.

At least some examples provide a data processing method comprising:
executing instructions of a plurality of threads of processing using processing circuitry and hardware registers for storing context data for the plurality of threads concurrently; and
selecting, from among a plurality of software-scheduled threads scheduled for execution by software executing on the processing circuitry, one or more active threads to be executed concurrently on the processing circuitry;
wherein the number of active threads is adjusted in dependence on at least one performance metric indicative of processing performance of the one or more active threads.

Further aspects, features and advantages of the present technique will be apparent from the following description of examples, which is to be read in conjunction with the accompanying drawings.

DESCRIPTION OF EXAMPLES

Figure 1:
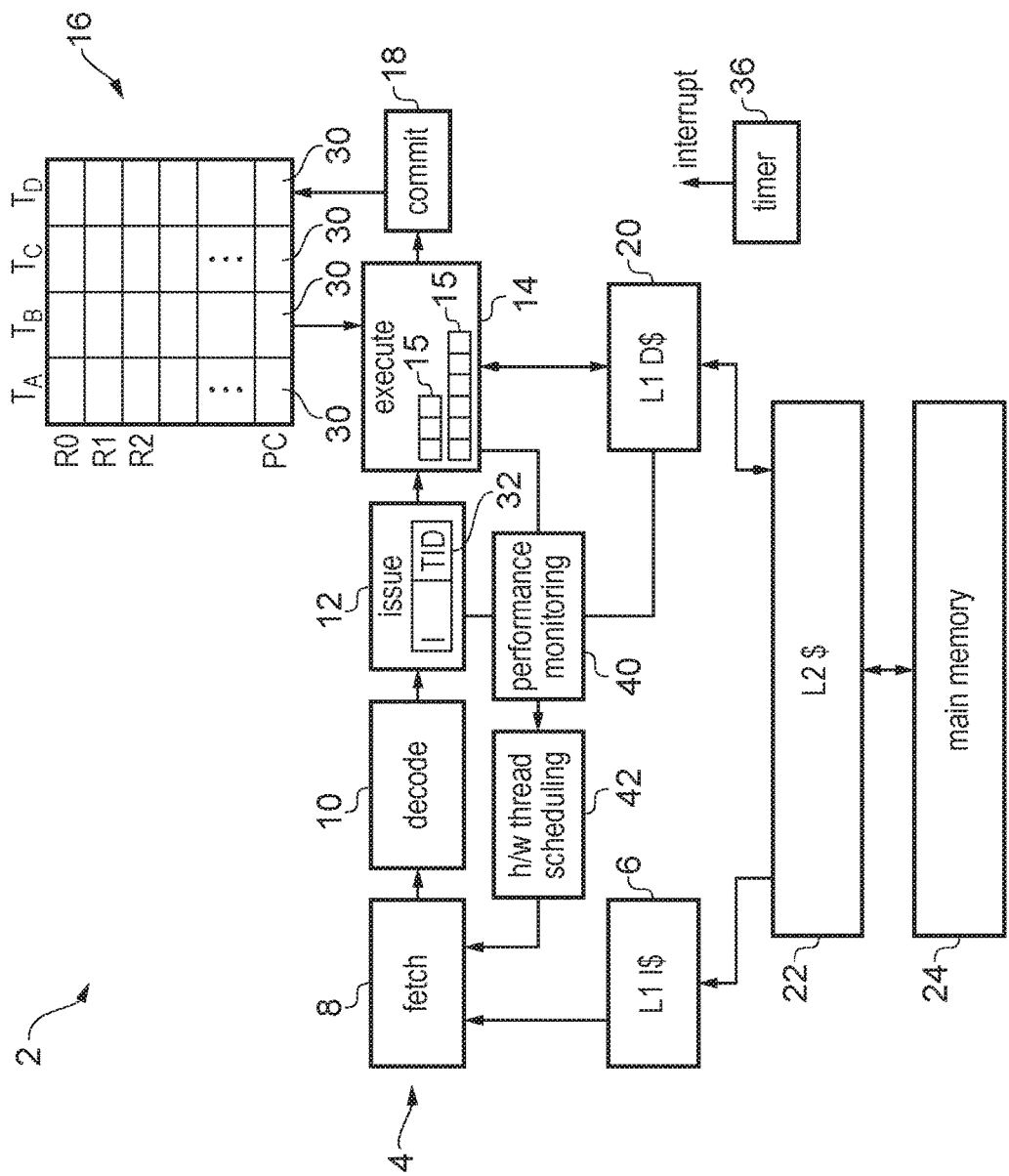
FIG. 1 schematically illustrates an example of an in-order pipeline supporting execution of multiple hardware threads with context data for each of the threads stored in hardware registers concurrently.

An apparatus may have processing circuitry to execute instructions from two or more threads of processing and hardware registers to store context data for the two or more threads concurrently. By supporting instructions from multiple threads being in flight simultaneously with the context data for each of the multiple threads available in the hardware registers concurrently, this avoids the need for an operating system to trigger context switches each time a different thread is required. This approach enables better performance in most cases because hardware resources which may not be fully utilised by a single thread can be more efficiently utilised by multiple threads and because when one thread has its instructions stalled then instructions from other threads may be executed in the meantime to reduce the overall latency associated with processing the set of threads as a whole. In many cases, executing a greater number of threads concurrently on the processing circuitry may therefore improve performance.

However, in some situations this approach does not scale and the overall throughput actually degrades with increasing numbers of hardware threads. That is, running with more hardware threads executed concurrently on the processing circuitry may take longer than if fewer threads are executed at the time. For example, this situation may be caused by threads starving for hardware resources within the processing circuitry or interfering in their accesses to a memory system.

To address this issue hardware thread scheduling circuitry is provided to select, from among two or more software-scheduled threads scheduled for execution on the processing circuitry by software executed by the processing circuitry, one or more active threads to be executed concurrently on the processing circuitry. The hardware thread scheduling circuitry may adjust the number of active threads in dependence on at least one performance metric which is indicative of processing performance of the one or more active threads.

Hence, the hardware thread scheduling circuitry can determine from at least one performance metric whether running with an increased number of active threads is beneficial, and increase or reduce the number of active threads accordingly for the purpose of improving processing throughput.

The hardware thread scheduling circuitry may control how many threads are selected as the active threads by controlling which instructions are fetched by fetch circuitry for fetching instructions from an instruction cache or memory for processing by the pipeline. Hence, the hardware thread scheduling circuitry may control the fetch circuitry to fetch instructions of the one or more active threads, but not fetching instructions of the other inactive software-scheduled threads which have not been selected as the active threads. Note that at the time of adjusting the number of active threads there may still be instructions from some of the suspended threads resident within the pipeline, and these instructions may take some time to drain. Therefore, a reduction in the number of active threads may not take place instantly, but may be a gradual change over time as the instructions of the suspended threads are drained and replaced with instructions exclusively fetched from the active threads. Similarly, there may be a warm up period when fetching instructions from a new thread after increasing the number of active threads.

The hardware thread scheduling circuitry could in some cases continuously monitor the performance metrics and adjust the number of active threads accordingly. However, in practice this may consume an unnecessary amount of power and also it may be desirable to allow the performance metrics to be gathered over a certain period before adjusting the number of active threads, to avoid responding too hastily to temporary changes in the level of performance. Hence, in some examples the hardware thread scheduling circuitry may review the selection of active threads at intervals of a certain hardware thread switching period. The length of the hardware thread switching period could for example be selected to be long enough to amortise the cost of hardware-triggered context switches between threads and to allow caches, branch predictors or other resources to be warmed up for the newly selected threads. On the other hand, the hardware thread switching period may be shorter than a software thread switching period defining intervals at which an interrupt is signalled to trigger the software (e.g. an operating system) to review which threads are scheduled as the software-scheduled threads. Hence, within the time quantum with which a given set of software scheduled threads are to be executed, there may be multiple intervals of the hardware thread switching period so that the hardware thread scheduling circuitry is able to react more rapidly to changes in observed performance than would be possible than if cases of poor performance were handled by trapping to the operating system or other software which schedules the software-scheduled threads.

Other than causing a change in the level of performance observed during execution of the threads, the adjustment of the number of active threads by the hardware thread scheduling circuitry can be transparent to the software which schedules the software scheduled threads. From the point of view of the software, all of the software-scheduled threads are being executed concurrently, and the software may be unaware that the hardware thread scheduling circuitry is varying the selection of which subset of those threads are executed at a given time. An advantage of controlling the active thread switching in hardware rather than software is that the level of interference between threads experienced may be implementation-dependent (running the same set of threads on a different platform with different sized hardware resources may result in a different amount of interference), and also it can be difficult for the software to determine whether certain performance issues are caused by interference by threads competing for limited resource or by other factors affecting the efficiency of a single thread, such as memory system access delays. The hardware scheduling circuitry may have a better view of the current resource utilisation conditions within the pipeline or of certain micro-architectural events such as cache evictions caused by a different thread, so can be in a better position to schedule the number of active threads to improve performance. Also, the hardware can typically react faster to changes in thread execution behaviour than the software.

When the number of active threads is at least two, the hardware thread scheduling circuitry may detect whether an interference condition has occurred which indicates a reduction in performance based on the at least one performance metric. In response to detecting an interference condition, the hardware thread scheduling circuitry can then trigger a reduction of the number of active threads. For example, if the current set of active threads is detected to hit a resource bottleneck then the hardware thread scheduling circuitry may control the fetch circuitry to stop fetching from some of the active threads, allow their instructions to drain the pipeline and then leave the processing circuitry executing instructions from the remaining threads. In some cases the hardware thread scheduling circuitry may trigger an immediate reduction of the number of active threads when the interference condition has been observed, without waiting until the end of the current hardware thread scheduling period. The definition of the interference condition may be such that at least a certain number of instances of a given resource bottleneck may be required in order to trigger the reduction in the number of active threads. However, in other examples when an interference condition is detected then the hardware thread scheduling circuitry could wait until the end of the current hardware thread switching period before reducing the number of active threads the next time it reviews which threads are to be active.

Some implementations may permit arbitrary reductions of the number of active threads by any number, for example decrementing the number of active threads by one or more on occurrence of the interference condition. However, in some implementations it may be more efficient to reduce the number of active threads by half in response to detected interference condition. For example, by only permitting numbers of active threads which correspond to a power of two this may make implementation more efficient because for example thread identifiers could then be reduced to a smaller number of bits depending on the power of two selected. Of course, if the maximum number of hardware threads supported by a given system is two, then any reduction in the number of active threads by definition would be by half as the reduction would be from 2 threads to 1 thread. Nevertheless, systems supporting more than 2 hardware threads may reduce the number of active threads by half, or by another amount, when an interference condition is detected.

On detecting the interference condition, the hardware thread scheduling circuitry may trigger saving of context data for a subset of the active threads from the hardware registers to a memory system, and then make the hardware registers that store the context data for the subset of active threads available for reallocation for storing context data for remaining active threads. This approach can be particularly useful for an out-of-order processor, where a renaming stage may be provided in the pipeline for renaming architectural register specifiers specified by instructions fetched from an instruction cache or memory to physical register specifiers identifying registers within the hardware register file which are to be used for storing the operands of that instruction. When register renaming is supported, the renaming stage may allow dynamic allocation of different portions of the register file to different threads, and so by saving the context data for the newly inactive threads to memory following the interference condition this can allow those physical registers to be reallocated to other threads, reducing the chance that instructions of the other threads stall because there are insufficient available physical registers for handling the instructions.

Alternatively, other implementations may not save context data to memory when reducing the number of active threads, and may simply retain the context data of the newly inactive threads in the register file. For example, for an in-order processor the pipeline may not support register renaming, and instead the hardware register file may simply be partitioned in fixed blocks to define a set of registers available for each thread. In this case, there is unlikely to be a benefit in saving the context data as other threads cannot use the outgoing thread's registers, so to improve performance by eliminating the state saving memory operations, the context data for the outgoing threads can be simply be retained in the register file.

The number of software-scheduled threads may often correspond to the maximum number of active threads supported by the processing circuitry in hardware, but could also be less than the maximum if the software chooses to schedule fewer threads. When the number of active threads is less than the number of software-scheduled threads, the hardware thread scheduling circuitry may periodically switch which of the software-scheduled threads are the active threads. For example, the hardware thread scheduling circuitry could rotate which threads are selected as the active threads according to a round robin approach. This allows the hardware thread scheduling circuitry to provide forward progress for all of the software-scheduled threads which have been selected for execution by the software. Hence, at the end of a hardware thread switching period, even if the number of active threads is not being changed, there can still be a change in the selection of which threads are active to ensure greater fairness in balancing forward progress of each thread.

The performance metric used to determine the number of active threads can be any metric indicative of a level of performance achieved for a thread (e.g. number of stall cycles experienced for a given thread, or number of cache misses detected for a given thread), or a more indirect measure of performance such as a status of the pipeline or occurrence of an event that can affect performance. For example, the performance metric can be a resource utilisation metric which indicates a level of utilization of a certain hardware resource, or a resource contention metric which tracks events when multiple active threads contend for limited resource. For example, the at least one performance metric can be dependent on a number of stall cycles when an instruction is stalled due to insufficient capacity of a given hardware resource, or on a level of utilisation of a given hardware resource. In some cases the hardware thread scheduling circuitry may consider two or more different performance metrics, e.g. corresponding to different hardware resources or different types of contention events. The hardware thread scheduling circuitry could combine multiple individually captured metrics into a single combined metric used for the scheduling decision, or could use a confidence based approach where certain events such as cases of low hardware resource availability or high contention may increment a counter, cases of high hardware resource availability or low contention decrement the counter, and the scheduling decision is based on a comparison of the counter with a threshold, for example. Hence, it will be appreciated that many alternative techniques can be used for tracking one or more performance metrics and making the active thread scheduling decision based on the tracked metrics.

Another example of a performance metric that could be used may be a metric dependent on a number of abort events when speculative results of speculatively performed processing operations are to be discarded. In a system with thread level speculation or transactional memory (hardware or software), additional threads may increase the probability of conflicts and therefore aborts. More threads also put more pressure on hardware resources that keep track of speculative state, also potentially triggering more abort events (when speculative results are discarded and processing is restarted from an earlier point corresponding to non-speculative state). Hence, if enough aborts are detected so that performance is reduced (e.g. the transaction abort rate above a threshold in the context of transactional memory), the hardware thread scheduling circuitry may reduce the number of active threads.

The hardware resource tracked by the metric can be any of a wide variety of different hardware resources within the processing circuitry or the processing apparatus as a whole. Examples of hardware resources which can be monitored can include: functional units of the processing circuitry for executing given class of instructions; available hardware registers which are available for allocation for storing operands of instructions of the active threads; a reorder buffer to track commitment of instructions following out of order execution; a load/store unit to process load/store transactions for accessing data in a memory system; an issue queue to queue instructions to be issued for execution; and/or available cache miss handling status registers (e.g. cache linefill registers/buffers for holding data awaiting allocation to a cache or cache eviction registers/buffers for holding data awaiting writeback to a further cache or memory). For example, the interference event could be detected when a bottleneck is identified in any hardware resource, for example the number of stall cycles due to busy functional units being over a certain threshold, or the number of stall cycles due to a lack of reorder buffer entries, lack of available physical registers or lack of load/store queue entries being greater than a threshold.

In some implementations the system may have some performance monitors which gather performance metrics which are made accessible to software executing on the processing circuitry and in this case some of those existing performance monitors could be reused to generate a performance metric used by the hardware thread scheduling circuitry. However, these could also be supplemented with additional performance metrics which are gathered for the purposes of the hardware thread scheduling and are not made accessible to the software.

Another example of a performance metric that can be used is a cache conflict metric which is indicative of conflict between threads accessing data from a shared cache. The shared cache could be a data cache, an instruction cache or an address translation cache such as a translation lookaside buffer (TLB) for storing address translation data used for translating virtual addresses into physical addresses. One possible cause of the inter-thread interference phenomenon (which causes a greater number of active threads to have lower performance than a smaller number) can be interference in accessing data from a shared cache. For example, where two threads have relatively large working sets of data, instructions from one thread may evict data from another thread in order to allocate its own data to the data cache, but then when an instruction from the second thread executes this may evict the data allocated by the first thread to allocate its data to the cache. This can keep occurring leading to cache thrashing. Hence, continuing to attempt to process the two threads concurrently may lead to a severe loss of performance since neither threads may be able to make sufficient progress due to the conflict in accessing the cache. A similar problem can arise for a TLB where the two or more threads may keep evicting each others page table entries from the TLB.

Hence, the cache conflict metric may depend on the number of evictions of a cache entry associated with one thread which are triggered by allocation of a cache entry associated with a different thread. Any existing mechanism for tracking cache conflict known in the literature can be used to derive the cache conflict metric. For example one approach could be for evictions from a given level of cache to be tagged with an identifier of the other thread which triggered the eviction. For example, when data associated with thread 1 is evicted due to an allocation by thread 2, the data associated with thread 1 may then be tagged with the thread identifier of thread 2 in a further level cache. Later, when the data from thread 1 is brought back in to the cache, the thread identifier of the thread which previously evicted it can be checked and this can be used to increment counters which track inter-thread evictions in order to derive the cache conflict metric. It will be appreciated that there are other techniques which could be used to generate the cache conflict metric.

When the number of active threads is less than the number of software-scheduled threads, the hardware thread scheduling circuitry may detect, based on the at least one performance metric, a thread restoration condition indicative of spare resource available for handling additional threads. In response to detecting the thread restoration condition, the hardware thread scheduling circuitry may then trigger an increase in the number of active threads. Again, the increase in the number of active threads could be by an arbitrary amount or in some implementations could be restricted to a doubling of the number of active threads. Hence, if the current set of running threads leaves enough resources underused that could accommodate additional threads, the number of active threads can be increased and instructions can start to be fetched from other software-scheduled threads as well until potentially having all of the software selected threads active at the same time. For example, the thread restoration condition may comprise a detection that utilisation of a given hardware resource is less than a threshold amount. The hardware resource could be any of the examples given above. For example, the thread restoration condition could be detected based on finding slack in utilisation of shared resources such as the number of free processing cycles on certain functional units being greater than the number of cycles in which instructions are actually issued, or detecting that the utilisation of a reorder buffer, physical register file or load/store queue is below a threshold.

When the number of active threads is less than the number of software-scheduled threads, there may be risk that one of the active threads may need to wait for an event triggered by one of the inactive software-scheduled threads in order to make progress. For example, an inactive software-scheduled thread may previously have locked a shared synchronization resource and this lock may need to be released before one of the active threads can use the resource. Hence, in some cases the fact that some of the software-scheduled threads are not making progress may cause unexpected delays to active threads.

Therefore, when the number of active threads is less than the number of software-scheduled threads, the hardware thread scheduling circuitry may detect whether a wait condition has occurred where one of the active threads is waiting for a certain event for greater than a predetermined period. If the active thread is waiting for a certain event for an unduly long period of time, one possible reason may be that it requires one of the inactive threads to proceed. Depending on the round robin switching of active threads, in practice the active thread and the inactive thread which may need to communicate or synchronise may not actually be executing concurrently and so this can cause significant performance issues if each interaction between the two threads must wait until after the current hardware scheduling period in order to make progress. Therefore, to address this problem when the wait condition is detected, the hardware thread scheduling circuitry may trigger a replacement of the active thread which encounters the wait condition with an inactive software-schedule thread. The hardware thread scheduling circuitry need not necessarily be aware of which particular software-scheduled thread the replaced active thread is waiting on but by triggering a replacement of the active thread so as to change the combination of active threads being executed when the wait condition is encountered, then this can increase the chance that the synchronisation delays can be resolved.

On the other hand, even if the replacement thread is triggered, it is possible that this may still not resolve the delay. Hence, if the wait condition is detected for the same thread a predetermined number of times over multiple hardware thread scheduling windows, then eventually the hardware thread scheduling circuitry may trigger the software to reschedule which threads are selected as the software-schedule threads. For example, it may be that the particular threads selected in the given batch to be executed concurrently by the software cannot efficiently run together with the available resources, and so it is more efficient to trigger the software to vary the combination of threads which are being executed concurrently.

It is also possible to provide a special hardware yield instruction which can be used in waiting/idle loops to trigger the hardware thread scheduling circuitry to swap out a thread which is waiting. Hence, in response to execution of a hardware yield instruction of one of the active threads, the hardware thread scheduling circuitry may trigger a replacement of said one of the active threads with an inactive software-scheduled thread. For example, the hardware yield instruction could be executed conditional on a loop count so that it is executed if the software has reached a given number of iterations of the waiting/idle loop. This approach reduces the complexity for the hardware thread scheduling circuitry, as it is not necessary for the hardware thread scheduling circuitry to track how long a given thread has been waiting. Instead, the software may be written so that if a wait condition is encountered then the hardware yield instruction is executed to instruct the hardware thread scheduling circuitry to switch out the waiting thread.

Alternatively, delays caused by an active thread waiting for an inactive thread could be handled entirely in software, with the program code for a given thread including a waiting loop which retries a certain number of times before trapping to the operating system to reschedule which threads are executing. Hence, it is not essential to implement a yield-after-wait mechanism in hardware.

FIG. 1 illustrates an example of a data processing apparatus 2 which includes a processing pipeline 4 having a number of pipeline stages. The pipeline 4 is an in-order processing pipeline, so instructions are issued and committed in their original program order (corresponding to the order in which the instruction addresses are defined for the corresponding program). The instructions for a number of threads of processing are stored in a level 1 instruction cache 6. The processing pipeline includes a fetch stage 8 for fetching instructions from the instruction cache 6, a decode stage 10 for decoding the fetched instructions, an issue stage 12 for determining whether required operands for processing of the instructions are available and issuing the instructions for execution when their operands are available, an execute stage 14 for executing the instructions using the operands which are read from a register file 16 to generate processing results, and a commit stage 18 for committing the processing results to architectural state by writing the results to the hardware registers 16 for committed instructions. The commit stage commits the instructions in program order. The execute stage 14 includes a number of functional units 15 each providing an execution pipeline for executing a corresponding class of instructions. For example, one functional unit may execute integer instructions, another may execute floating-point instructions while another functional unit may execute load/store instructions. It is also possible to provide two or more functional units of the same type which each execute the same class of instructions. For example for performance reasons it may be useful to provide multiple integer functional units. One of the functional units 15 may be a load/store unit for triggering memory system accesses in response to load/store instructions. In response to the load/store instructions, the load/store unit unit may trigger an access to data in a level 1 data cache 20. The level 1 instruction cache 6 and level 1 data cache 20 are part of a memory system which may also include one or more further level caches, such as level 2 cache 22 shared for data and instructions, as well as main memory 24. It will be appreciated that this is just one example of a possible memory hierarchy and other arrangements can also be used.

The in-order pipeline 4 supports simultaneous multi-threading so that instructions from multiple threads can be in flight within the pipeline concurrently. A number of hardware features are provided to enable this. For example, the register file 16 includes sets of hardware registers for storing multiple sets of architectural state data for each of a number of threads. For example, in FIG. 1 the system supports up to four threads being executed concurrently, and so four sets of context data registers R0-Rn, PC are provided, one for each thread. This includes a program counter register 30 which indicates the current point of execution reached for a given thread, and therefore multiple program counter registers are provided so that each thread can be indicated as reaching a different point of execution. It will be appreciated that other control information registers could also be banked per thread. Also, instructions passing down the pipeline are accompanied by a thread identifier 32 which identifies which thread the instruction belongs to. The thread identifier can then be used for scheduling of instructions at the issue stage 12 to take account of register dependencies between instructions of the same thread, at the execute stage 14 for determining which banked version of the register file to access for the instruction's operands, and at the commit stage for controlling commitment of a given thread so that the instructions from a given thread are committed in their original program order, while instructions from different threads can be committed in any order.

Threads may be scheduled for execution on the processing pipeline 4 by software executed by the processing pipeline (e.g. an operating system may schedule threads of processing to be performed at the application-level). A timer 36 may be provided to trigger an interrupt at periodic intervals of a certain defined software thread switching period, with the interrupt triggering the operating system to review which threads are scheduled for execution before returning processing to the threads. The timer 36 is an example of interrupt generating circuitry.

The apparatus 2 is provided with performance monitoring circuitry 40 for monitoring various resources of the processing pipeline 4 or memory system during execution of instructions from the threads to gather various performance metrics. For example, the performance monitoring circuitry 40 could monitor the number of cycles for which instructions are stalled at the issue stage 12 or execute stage 14 in a given functional unit 15, or track the utilisation of the load/store queue. The performance monitoring circuitry 40 can also gather information regarding potential cache conflict between threads in the level 1 data cache 20, or in other caches such as a TLB for caching address translation data. Another metric that could be gathered may be information dependent on the number or rate of abort events when speculative processing is discarded (this can be particularly useful for a system using thread level speculation or transactional memory). The performance monitoring circuitry may comprise a number of event counters or resource utilisation monitors for gathering information which indicates whether or not there is a resource bottleneck potentially caused by competition or interference between the hardware threads.

Hardware thread scheduling circuitry 42 is provided to determine, based on the performance metrics gathered by the performance monitoring circuitry 40, how many threads should be executed concurrently on the pipeline 4. In general, the software executing on the processor, such as an operating system, may select a given number of software-scheduled threads to be executed in parallel. For example, the operating system may generally select the maximum number of threads supported by the hardware (4 in this example). However, if the hardware thread scheduling circuitry 42 determines based on the performance metrics that performance could be improved if fewer threads are executed, then the hardware thread scheduling circuitry 42 may reduce the number of active threads. Similarly, if the number of active threads is less than the maximum and the performance metric indicates that there is spare capacity on hardware resources of the processor then the hardware thread scheduling circuitry may increase the number of active threads. The hardware thread scheduling circuitry 42 provides the fetch circuitry 8 with an indication of the number of active threads and/or of which threads are the active threads. The fetch circuitry 8 fetches instructions exclusively from the active threads and does not fetch instructions from inactive threads.

Figure 2:
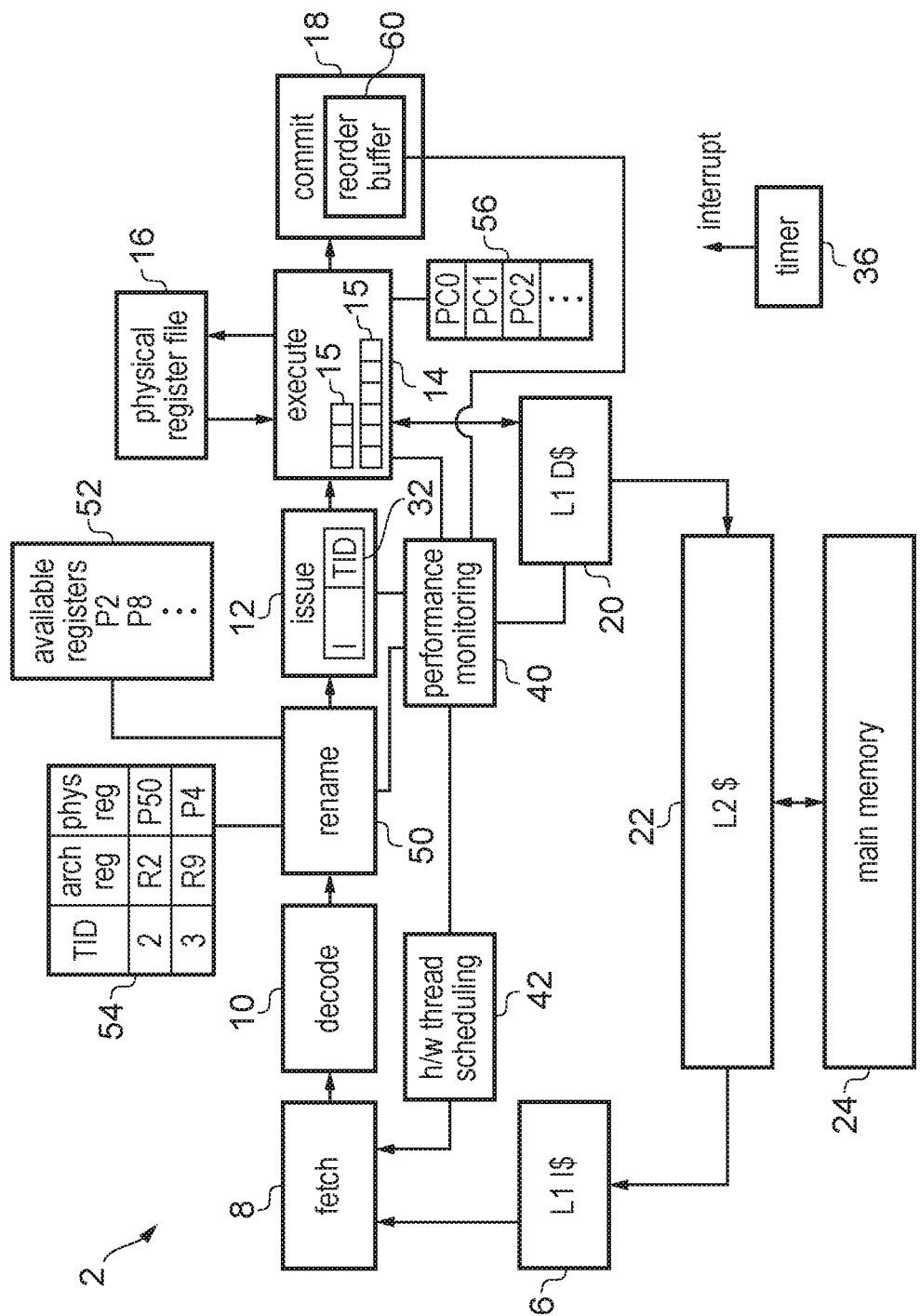
FIG. 2 shows an example of an out-of-order pipeline supporting multiple hardware threads.

FIG. 2 shows another example of a processing pipeline provided with hardware thread scheduling circuitry 42, but in this case the pipeline is an out of order pipeline rather than an in-order pipeline as in FIG. 1. Elements of FIG. 2 which are the same as in FIG. 1 are indicated with the same reference numerals. In the out of order pipeline of FIG. 2, a register renaming stage 50 is provided for performing register renaming between the decode an issue stages 10, 12. In the out of order pipeline, a physical register file 16 is provided with a greater number of physical registers than the number of architectural registers that can be specified by instructions as defined in the relevant instruction set architecture (ISA). Physical registers from the register file 16 can be dynamically allocated to different threads by the rename stage 50. Hence, this is different to the approach shown in FIG. 1 where the register file 16 is partitioned with a certain fixed partitioning and groups of registers are allocated to a particular thread. The rename stage 50 has an available register list 52 which indicates physical registers of the register file 16 which are not currently allocated for storing data for some of the threads or are retaining previous register state which could still be required if effects of a speculatively executed instruction have to be cancelled. While FIG. 2 shows the available register list 52 for ease of explanation as a list of register numbers P2, P8 etc., in practice it may comprise a bitmap of bit values of 0 or 1 indicating whether or not each particular physical register is available or not. Also, the rename stage 50 maintains a register renaming table 54 which tracks the mappings between architectural register specifiers specified by program instructions passed from the decode stage 10 to physical registers mapped onto the physical register file 16. Separate rename tables 54 may be maintained for each thread, so that for example architectural register R2 for thread 1 may map to a different physical register to architectural register R2 for thread 2. Alternatively, a single rename table 54 could be shared between threads, with the renaming table indexed by a value obtained by concatenating the thread ID and the architectural register specifier, so that different entries are indexed for the same architectural register specifier when accessed by different threads. Any known register renaming technique may be used. Since the physical registers can be reallocated dynamically to different threads as appropriate, the program counters associated with each thread and any other fixed control state which may be required for each thread may be brought out of the physical register file 16 and placed in separate banked control registers 56 as shown in FIG. 2. However, other examples may store each thread's control state information within the same physical register file 16 used for general purpose operands.

In the out-of-order pipeline, the commit stage 18 also includes a reorder buffer 60 which has a number of entries for buffering instructions which have completed execution in the execute stage 14 but are still to be committed by the commit stage 18. Instructions may be executed in a different order to their program order at the execute stage 14, but then commit in order at the commit stage 18 with the reorder buffer tracking which instructions have or have not been executed. It will be appreciated that an out-of-order pipeline may also have other structures which would not be provided in an in order pipeline.

As in FIG. 1, the out of order pipeline of FIG. 2 has performance monitoring circuitry 40 and hardware thread scheduling circuitry 42 which functions in the similar way to discussed above, except that the performance monitoring circuitry 40 may monitor additional hardware resources for performance metrics, such as tracking the number of available registers in the available register list 52 or the number of available entries in the reorder buffer 60. Hence, the techniques discussed herein can be applied to either and in-order SMT processor or an out-of-order SMT processor.

Figure 3:
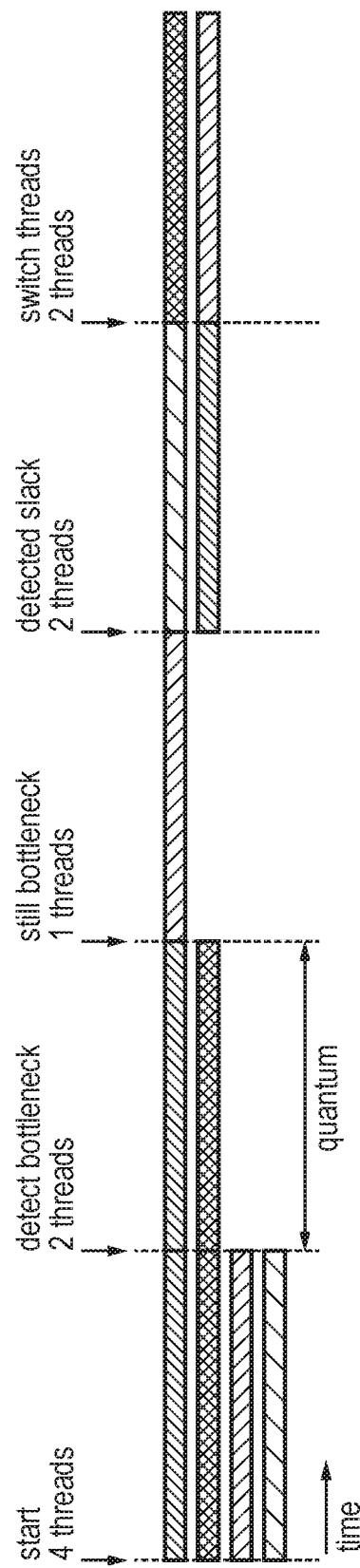
FIG. 3 shows an example of adjusting the number of active threads executed on the pipeline in dependence on at least one performance metric.

FIG. 3 shows an example of dynamically adjusting the number of active threads using the hardware thread scheduling circuitry 42. In this example the hardware thread scheduling circuitry 42 reviews which threads are the active threads periodically at intervals of a given time quantum (hardware thread switching period). In this example the maximum number of threads supported is 4, and on returning from a software thread scheduling event by the operating system, the operating system schedules the maximum number of threads and so processing starts with 4 threads. However, on expiry of the first time quantum a bottleneck in performance is detected based on the metrics from the performance monitoring circuitry 40 and so the hardware thread scheduling circuitry 42 halves the number of active threads to reduce the number of active threads to 2. At the end of the next time quantum, the bottleneck is still encountered and so a further reduction in the number of threads to 1 is triggered by the hardware thread scheduling circuitry 42. Hence, now the fetch circuitry 8 will only fetch instructions from one particular thread. Later, a thread restoration event is detected when there is slack in the available hardware resources and at this point the hardware thread scheduling circuitry 42 determines that the system can accommodate an additional thread, increasing the number of threads that are active to 2. The system then settles at 2 active threads as the most appropriate number of threads to execute concurrently. At the end of each subsequent time quantum the hardware thread scheduling circuitry 42 rotates which threads are the active threads to allow each of the 4 software-scheduled threads to make progress.

In other examples, rather than doubling or halving the number of threads when the slack in resources or a resource bottleneck in resources is detected, the number of threads could also be increased or decreased by one or some other value. When switching threads out, its context can potentially be saved to memory to free up physical registers (this can be useful for the out-of-order pipeline of FIG. 2). Nevertheless, even in an out-of-order pipeline, whether or not context state is saved to memory can be determined on an implementation basis because it is a trade off between allowing the remaining threads to use more registers to reduce the chances of stalls versus the cost and delay associated with saving and restoring state from memory.

Figure 4:
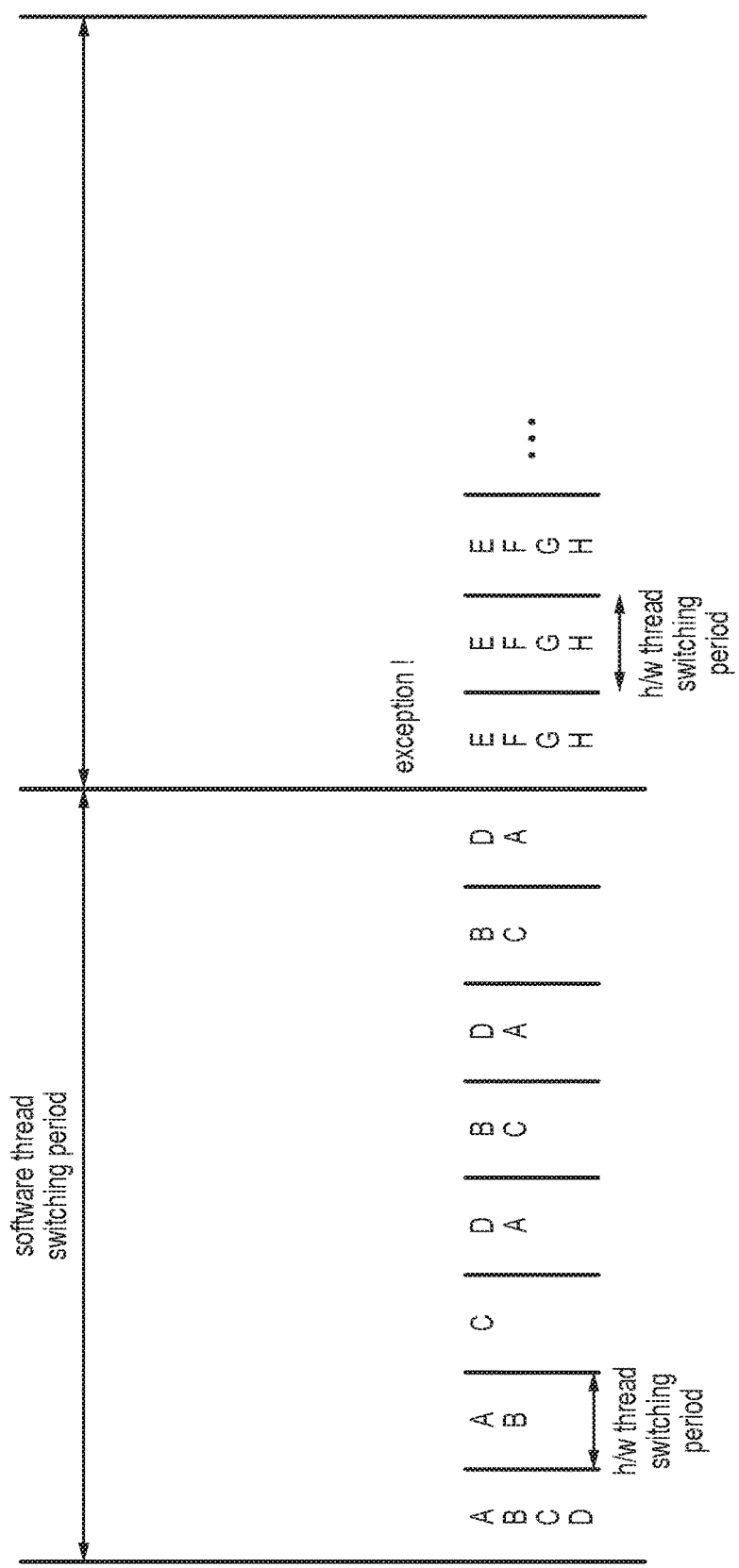
FIG. 4 shows how the hardware thread scheduling takes place at intervals which are shorter than a period defined for software thread switching.

As shown in FIG. 4, the hardware thread switching period with which the hardware thread scheduling circuitry 42 reviews the selection of threads may be shorter than the software thread switching period with which the software reviews which threads are selected for execution. An interrupt may be triggered on expiry of the software thread switching period to trap to the operating system in order to revise which threads are selected. In the example of FIG. 4, during the first software thread switching period 4 threads ABCD are selected and the number of threads dynamically adjusted in a similar way to FIG. 3 depending on the observed resource bottlenecks or thread restoration event. Eventually, the system settles to executing 2 active threads, and the threads are rotated on a round robin basis so that each of the threads ABCD can make some progress. On occurrence of the interrupt to trigger expiry of the thread switching period, the operating system reschedules which threads are executed and selects four new threads EFGH for execution. This time, no resource bottleneck is detected and so the hardware thread scheduling circuitry 42 continues to allow 4 threads to be executed as active threads concurrently. The hardware thread scheduling circuitry 42 continues to review at intervals of the hardware thread switching period whether this is still the preferred number of active threads and can make adjustments accordingly.

Figure 5:
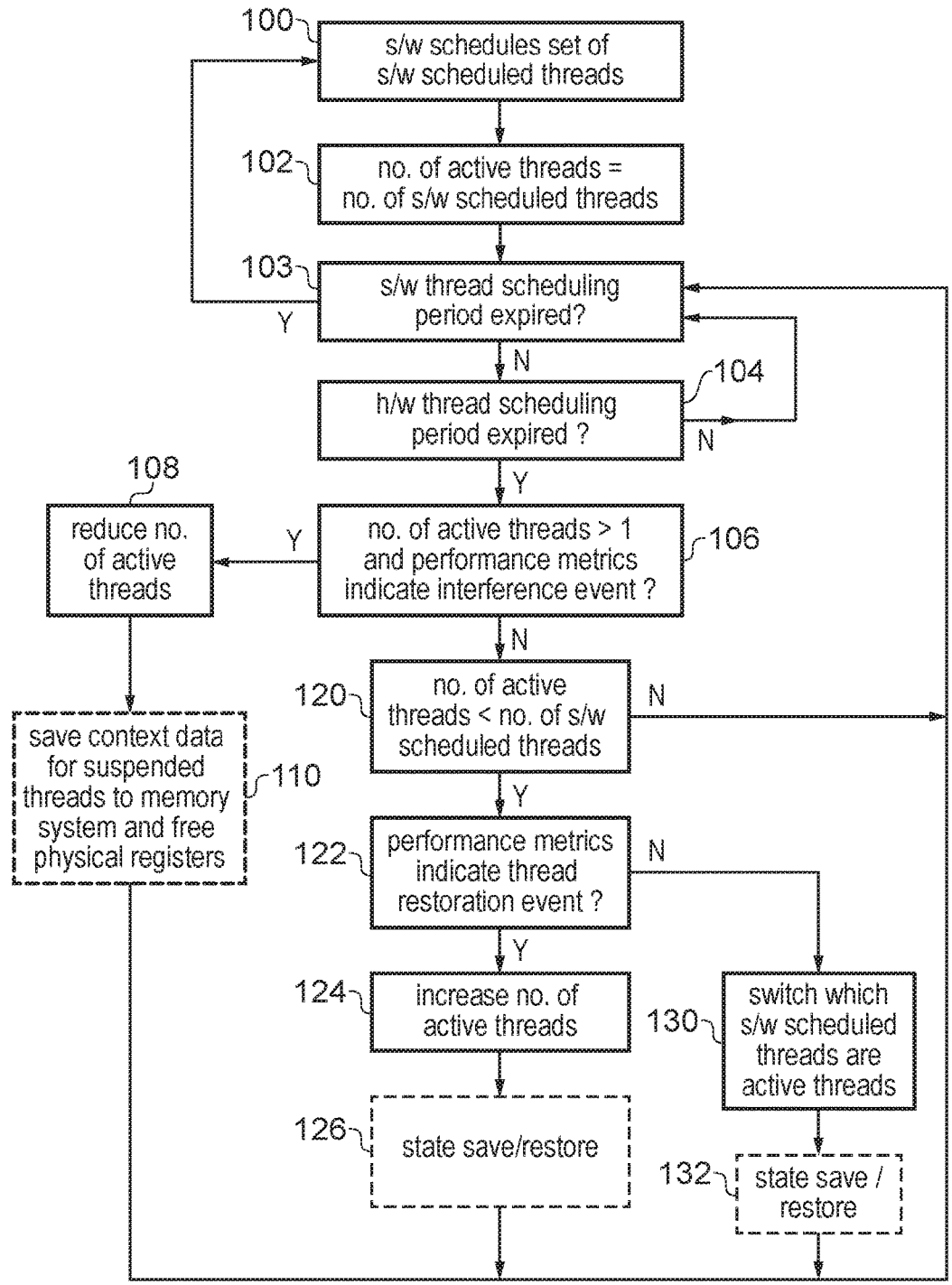
FIG. 5 is a flow diagram illustrating a method of scheduling hardware threads.

FIG. 5 is a flow diagram illustrating a method of scheduling active threads on the processing circuitry 4. At step 100 the software executing on the processing circuitry schedules a given set of software scheduled threads to be executed in parallel. For example, while generally the software may select the maximum number of threads supported by the hardware for execution as the set of software scheduled threads, in some cases the software could select fewer threads, for example if there are not enough threads to be executed to completely fill the available hardware resource or because previously it was detected that executing the maximum number of threads leads to performance difficulties. A configuration register may be provided storing an indication of the maximum number of threads supported by the hardware, which is made accessible to the software so that the software can identify the maximum number of threads it can schedule for parallel execution. For example, the maximum number of active threads may depend on how many bits are available for the thread identifiers associated with the instructions, or how many banked sets of physical registers 16 are provided. At step 102 the hardware thread scheduling circuitry 42 initially sets a number of active threads equal to the number of software-scheduled threads, and processing begins with fetch circuitry 8 fetching instructions from any of the software-scheduled threads. Processing continues, and as instructions from the respective threads are processed the performance monitoring circuitry 40 gathers the relevant performance metrics to be used by the hardware thread scheduling circuitry 42 for making its thread scheduling decisions.

At step 103, the processing circuitry determines whether the software thread scheduling period has expired. For example, a timer interrupt may be generated by timer 36 to interrupt the processing circuitry on expiry of the software thread scheduling period. When the software thread scheduling period expires, the timer interrupt causes the software to reschedule which threads are selected as the software-scheduled threads.

If the software thread scheduling period has not expired, then at step 104 the hardware thread scheduler 42 determines whether the hardware thread scheduling period has expired and if not continues to wait for the hardware thread scheduling period to end. Again, a timer interrupt may be generated by timer 36, with the time period for generating the hardware thread scheduling interrupt set shorter than the time period for generating the software thread scheduling interrupt. If the hardware thread scheduling interrupt has not expired, the method returns to step 103.

When the hardware thread scheduling period expires, then at step 106 the scheduler 42 determines whether the current number of active threads is greater than 1 and the one or more performance metrics monitored by the performance monitoring circuitry 40 indicates that an interference event has occurred. The interference event can be any event which signals a potential loss of performance caused by conflict or interference by the respective threads for some shared hardware resource such as the functional units 15, the issue queue 12, the reorder buffer 60, the load/store queue, or the number of available registers within the physical register file 16. Similarly, the interference could also be an event triggered by repeated eviction of a thread's data from the cache 20 by another thread leading to cache thrashing. If the number of active threads is greater than 1 and an interference event occurs, then at step 108 the hardware thread scheduler 42 reduces the number of active threads (e.g. by a half) and controls the fetch circuitry 8 to stop fetching instructions from the threads which are no longer active. In some cases when reducing the number of active threads the hardware thread scheduling circuitry 42 may retain some of the previously selected active threads as active threads so that they can continue unchanged, but it would also be possible for the reduced number of active threads to correspond to a subset of the software schedule threads which does not overlap with the subset of the software schedule threads which were being executed as active threads before the interference event was detected. For example, if at the time the interference event was detected the number of active thread was already less than the maximum then it may make sense to switch which threads are active at the same time as reducing the number of active threads, to allow the previously inactive threads to have a turn at making forward progress.

Optionally, following step 108, at step 110 context data from one or more suspended threads may be saved to the memory system 20, 22, 24 and the corresponding physical registers 16 used for storing the saved context data may be indicated as available in the available register list 52. This makes the registers available for storing state for other threads. Step 110 may be omitted for an in-order pipeline 4 or for some implementations of an out-of-order pipeline. Regardless of whether the context data is saved or not, the method then proceeds to step 103 to check once more for expiry of the software thread scheduling period.

If, following expiry of the hardware thread scheduling period, the number of active thread was 1 or no interference event occurred at step 106, then the method proceeds to step 120 where the hardware thread scheduler 42 determines whether the number of active threads is less than the number of software-scheduled threads. If the number of active threads is already equal to the number of software-scheduled threads, the method proceeds straight to step 103 and no action is taken as the absence of the interference event at step 106 means there is no need to adjust the active threads. As all of the software threads are executing they can each make progress and so there is no need to perform any thread switching.

If at step 120 the number of active threads is less than the number of software-scheduled threads, then at step 122 the hardware thread scheduler 42 determines whether the one or more performance metrics indicate that a thread restoration event has occurred. This may be any event which indicates that there is under-utilisation of a given hardware resource, such as a number of cycles in which instructions are not being issued being greater than the number of instruction slots which do contain issued instructions, or a level of utilisation of some hardware resource such as a functional unit, available register list, reorder buffer or load store queue being less than a certain threshold. If such a thread restoration event has occurred, then at step 124 the hardware thread scheduler 42 increases the number of threads (e.g. by doubling the number of active threads). The hardware thread scheduler 42 controls the fetch circuitry 8 to start fetching additional threads again, at this point there may be a switching of which threads are the active threads, so there is not necessarily a thread which was executing before the thread restoration event which continues to be executed after. In an optional step 126, state saving/restoration is performed to accommodate switching out/in of active threads. If context data for some of the restored threads was previously saved at step 110, then this context data is restored to the registers 16. If the available register list 52 shows insufficient number of available physical registers in order to accommodate the context data for the additional active threads, then the instructions for the thread whose context is being restored may be stalled for a number of cycles until a sufficient number of available registers become available. Also, even though the number of active threads is increased at step 124, there may still be swapping of threads out, because the hardware scheduling quantum has expired. Hence, step 126 may also include saving state of swapped-out threads to the memory system. However, saving of state out may not always be required. For example, if the number of active threads is being increased to match the total number of software-scheduled threads, then all available threads may be executed during the next hardware thread scheduling period, and in this case there may be no need to save any state to memory. After step 126, the method then proceeds to step 103.

If at step 122 the performance metrics do not indicate a thread restoration event then the method proceeds to step 130, where although the number of active threads does not need to change, the hardware thread scheduler 42 switches which of the software scheduled threads are the active threads. For example, this can be done using a round robin scheme where the least recently selected threads are now selected as the active threads. By rotating which threads are active this allows each of them to proceed so that the software does not experience any significant loss of performance. From the software point of view all of the threads are being executed. Again, when switching active threads, if the state saving and restoring is performed as discussed for steps 110, 126, then similar state saving or restoration operations may be needed when switching the threads. Hence, an optional step 132 may save context data for the outgoing threads from registers 16 to memory and load context data for the incoming threads from memory into the register 16. The method then goes to step 103.

In the examples above, the number of active threads is re-evaluated on expiry of the hardware thread scheduling period, with the number of active threads reduced if the performance metrics indicate an interference event. However, on some occasions it may be more efficient to keep the number of active threads the same even if the performance metrics indicate an interference event. For example, in a system supporting transactional memory, it may be preferable that hardware context switching or thread scheduling should not happen during a speculative period when a thread is executing a transaction, because it could complicate keeping track of read and write sets and conflict detection. Hence, hardware thread scheduling could be disabled during speculative transactions. Alternatively, the hardware thread scheduler 42 could vary which threads are chosen as the threads to remain active to improve the efficiency of the transactional memory operation. For example, the hardware thread scheduler 42 could try to pick the threads that are closer to finishing and committing a transaction as the threads to remain active, as opposed to those that are not running a transaction or are still early in the transaction. Hence, there is flexibility for the hardware thread scheduler to consider other factors in addition to the performance metrics, in determining how many active threads should be processed and determining which threads should be retained as the active threads.

The fact that some of the inactive threads are not making progress could add unexpected delays in synchronisations that involve an inactive thread receiving a message, reaching a synchronisation point or releasing a shared synchronisation resource such as a lock. While the software associated with a given thread could implement a mechanism to loop and yield if an unusually long busy waiting period has been encountered (the thread may typically yield after a given number of retries), this may take some time to kick in and the hardware scheduler 42 may be in a better position to resolve such delays which are caused by the fact that threads which the software believes are executing in parallel are actually not all being executed concurrently by the hardware. Instead, the hardware scheduler 42 may be provided with a mechanism to allow a yielding thread to be replaced with one of the inactive threads when a wait condition is detected. If such a thread is switched in again after the hardware thread scheduling period has expired, and again has to wait, that thread can decide after a certain number of retries to execute a software yield as discussed above to be removed from the list of software scheduled threads by the operating system. Hence, the idle loop could first spend a number of retries busy waiting and then a number of retries using the hardware yield mechanism before finally yielding to the operating system.

Figure 6:
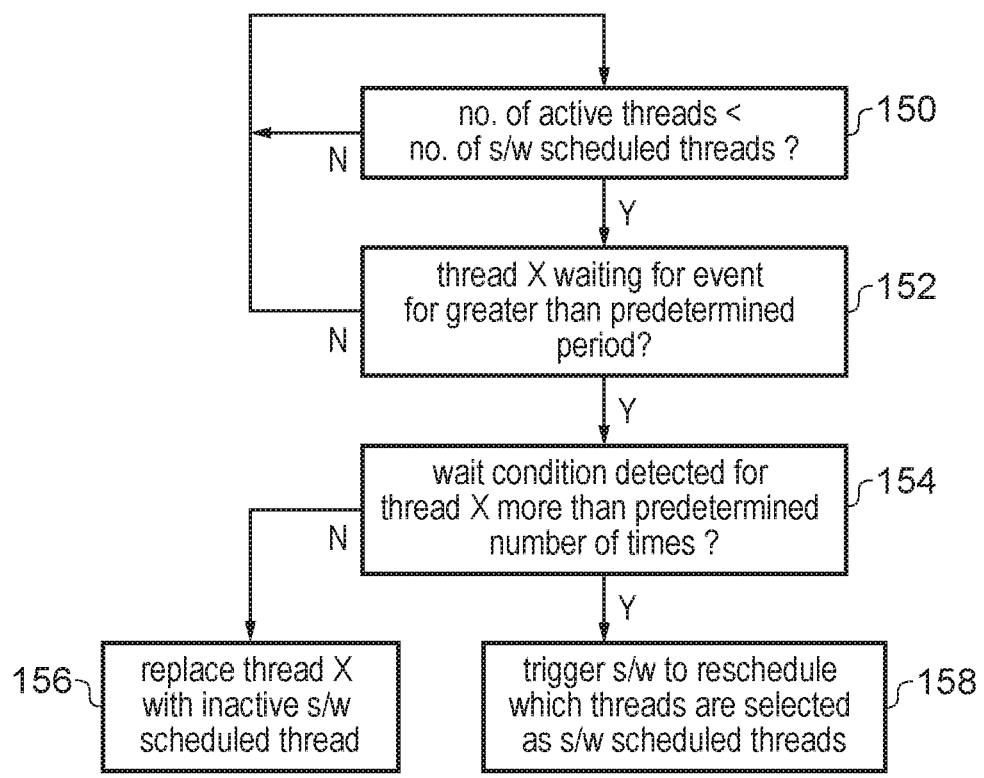
FIG. 6 is a flow diagram illustrating a method for replacing a given hardware thread when it is detected that the thread is waiting for a given event for greater than a predetermined period.

FIG. 6 shows a flow diagram for controlling the yield mechanism. At step 150 the hardware thread scheduler 42 determines whether the number of active threads is currently less than the number of software scheduled threads. If not then there is no need to check for a yield mechanism because all of the software scheduled threads are executing. If the number of active threads is less than the number of software scheduled threads, then at step 152 the thread scheduler 42 detects whether a given thread X has been waiting for a certain event for a greater than a predetermined period (the period could be determined in terms of time, a number of elapsed processing cycles, or a number of retries or iterations through a waiting loop). The wait for event could be for example release of a lock, receipt of a message from another thread, or another thread reaching a certain synchronisation point. In general, the wait may be for any kind of event which depends on progress being made by another thread. If no such wait condition has been identified, then again there is no need for any action, and the method may loop through steps 150 and 152 until eventually a wait condition is given for a given thread X in a case when the number of active threads is less than the number of software scheduled threads, when the method proceeds to step 154.

At step 154 the hardware thread scheduling circuitry 42 detects whether the wait condition has been detected more than a predetermined number of times. For example the hardware thread scheduling circuitry could maintain a counter which is incremented each time this wait condition is detected for a given thread. Note that these repeated instances of the wait condition may in fact correspond to different hardware time quanta since the wait condition triggers removal of the particular thread and so that thread will not be switched in again until a subsequent time quantum.

If the wait condition is not detected more than the predetermined number of times then at step 156 thread X is replaced with an inactive software scheduled thread by the hardware thread scheduling 42, to try to increase the chance that the other thread which thread X is waiting on can make progress and then allow thread X to be unblocked. On the other hand, if the wait condition has been detected more than a given number of times then at step 158 the hardware thread scheduler 42 can trigger software to reschedule which threads are selected as the software scheduled threads. For example the hardware thread scheduler 42 could trigger an exception to trap to the operating system.

In some cases, the wait condition may be detected to be satisfied at step 152 when a hardware yield instruction is executed for thread X. Hence, it is not necessary for the hardware thread scheduling circuitry 42 itself to track the time which thread X spent waiting for an event. The execution of the hardware yield instruction triggers the hardware thread scheduler 42 to switch out the waiting thread X at step 156 and replace it with another software-scheduled thread which was previously inactive.

Alternatively, the hardware thread scheduler 42 could be unaware of the number of times for which the wait condition has been detected for a given thread, and instead the trapping to the operating system could be controlled by the software itself so that the instructions of the given thread may define a program loop which includes retrying a number of times if the waited for event has not occurred yet. The number of retries may be defined such that the hardware thread scheduler 42 will reach the predetermined wait period at step 152 sooner than the number of retries required for the trapping to the operating system. In this case, on encountering the wait condition the hardware may proceed from step 152 direct to step 156 (omitting steps 154 and 158) to suspend the waiting thread and replace it with an inactive thread. However, if despite this replacement, when the thread is later switched in, there is still the wait condition then eventually the software may reach its retry limit and execute a software yield instruction to trigger a switch to the operating system, which adjusts the threads scheduled for execution to try to resolve the wait.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
processing circuitry to execute instructions of a plurality of threads of processing;
hardware registers to store context data for the plurality of threads concurrently; and
hardware thread scheduling circuitry to select, from among a plurality of software-scheduled threads scheduled for execution by software executing on the processing circuitry, one or more active threads to be executed concurrently on the processing circuitry; wherein:
the hardware thread scheduling circuitry is configured to adjust the number of active threads in dependence on at least one performance metric indicative of processing performance of the one or more active threads;
the hardware thread scheduling circuitry is configured to review the selection of active threads at intervals of a hardware thread switching period;
the apparatus comprises interrupt signaling circuitry to signal, at intervals of a software thread switching period, an interrupt for triggering the software to review which threads are scheduled as the plurality of software-scheduled threads; and
said hardware thread switching period is shorter than said software thread switching period.

2. The apparatus according to claim 1, comprising fetch circuitry to fetch instructions of said one or more active threads selected by the hardware thread scheduling circuitry for processing by the processing circuitry.

3. The apparatus according to claim 1, wherein other than causing a change in performance, the adjustment of the number of active threads by the hardware thread scheduling circuitry is transparent to the software for scheduling the plurality of software-scheduled threads.

4. The apparatus according to claim 1, wherein in response to detecting an interference condition indicative of a reduction in performance based on said at least one performance metric when the number of active threads is at least two, the hardware thread scheduling circuitry is configured to trigger a reduction of the number of active threads.

5. The apparatus according to claim 4, wherein in response to detecting the interference condition, the hardware thread scheduling circuitry is configured to trigger a reduction of the number of active threads by half.

6. The apparatus according to claim 4, wherein in response to detecting the interference condition, the hardware thread scheduling circuitry is configured to trigger saving of context data for a subset of the active threads from the hardware registers to a memory system, and to make the hardware registers storing the context data for said subset of the active threads available for reallocation for storing context data for remaining active threads.

7. The apparatus according to claim 1, wherein when the number of active threads is less than the number of software-scheduled threads, the hardware thread scheduling circuitry is configured to periodically switch which of the plurality of software-scheduled threads are the one or more active threads.

8. The apparatus according to claim 1, wherein said at least one performance metric is dependent on at least one of: a number of stall cycles when an instruction is stalled due to insufficient capacity of a given hardware resource; a level of utilisation of a given hardware resource; and a number of abort events when speculative results of speculatively performed processing operations are to be discarded.

9. The apparatus according to claim 8, wherein said given hardware resource comprises at least one of:
a functional unit of the processing circuitry for executing a given class of instructions; available registers of said hardware registers available for allocation for storing operands of instructions of said active threads;
a reorder buffer to track commitment of instructions following out-of-order execution of the instructions;
a load/store queue to queue load/store transactions for accessing data in a memory system;
an issue queue to queue instructions to be issued for execution; and available cache miss handling status registers.

10. The apparatus according to claim 1, wherein said at least one performance metric comprises a cache conflict metric indicative of conflict between threads accessing data from a shared cache.

11. The apparatus according to claim 10, wherein the cache conflict metric is dependent on a number of evictions of a cache entry associated with one thread triggered by allocation of a cache entry associated with a different thread.

12. The apparatus according to claim 1, wherein when the number of active threads is less than the number of software-scheduled threads, the hardware thread scheduling circuitry is configured to detect a thread restoration condition indicative of spare resource available for handling additional threads; and in response to detecting the thread restoration condition, the hardware thread scheduling circuitry is configured to trigger an increase in the number of active threads.

13. The apparatus according to claim 12, wherein the thread restoration condition comprises utilisation of at least one hardware resource being less than a threshold amount.

14. The apparatus according to claim 1, wherein when the number of active threads is less than the number of software-scheduled threads, the hardware thread scheduling circuitry is configured to detect a wait condition when one of the active threads is waiting for an event for greater than a predetermined period; and in response to detecting the wait condition, the hardware thread scheduling circuitry is configured to trigger a replacement of said one of the active threads with an inactive software-scheduled thread.

15. The apparatus according to claim 14, wherein in response to detecting said wait condition for the same thread a predetermined number of times, the hardware thread scheduling circuitry is configured to trigger the software to reschedule which threads are selected as the software-scheduled threads.

16. The apparatus according to claim 1, wherein in response to execution of a hardware yield instruction of one of the active threads, the hardware thread scheduling circuitry is configured to trigger a replacement of said one of the active threads with an inactive software-scheduled thread.

17. A data processing method comprising:
executing instructions of a plurality of threads of processing using processing circuitry and hardware registers for storing context data for the plurality of threads concurrently; and
selecting, from among a plurality of software-scheduled threads scheduled for execution by software executing on the processing circuitry, one or more active threads to be executed concurrently on the processing circuitry; wherein:
the number of active threads is adjusted in dependence on at least one performance metric indicative of processing performance of the one or more active, the selection of active threads is reviewed at intervals of a hardware thread switching period;
the method comprises signaling, at intervals of a software thread switching period, an interrupt for triggering the software to review which threads are scheduled as the plurality of software-scheduled threads; and
said hardware thread switching period is shorter than said software thread switching period.

* * * * *